Aug. 10, 1926.
F. E. CROMPTON
1,595,759
DOCUMENT GUIDE FOR MULTIPLEX WRITING MACHINES
Filed August 3, 1923    2 Sheets-Sheet 2
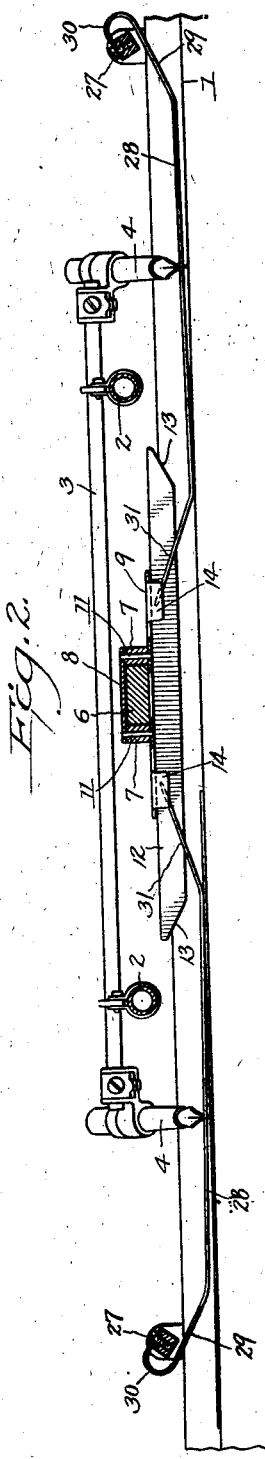
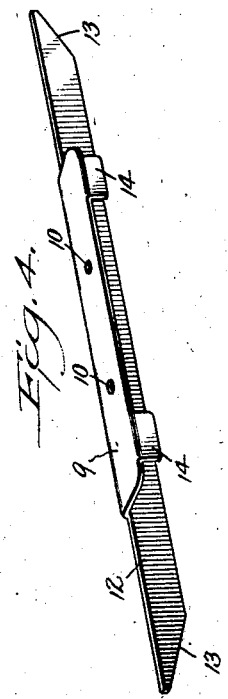
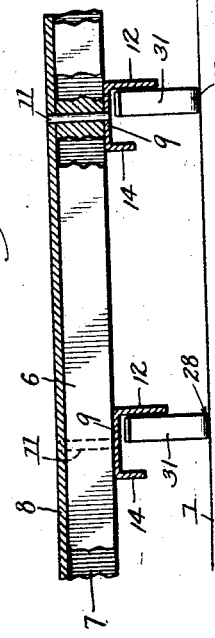
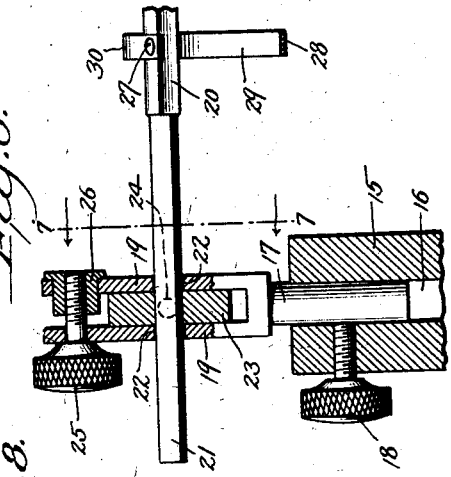
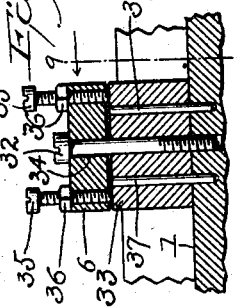
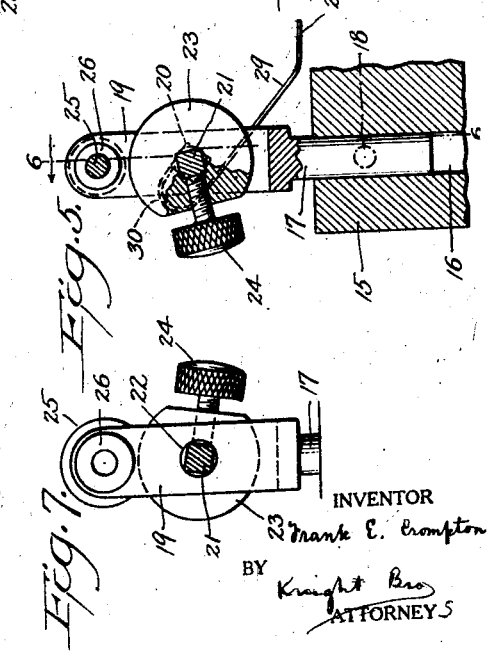
INVENTOR
Frank E. Crompton
BY Knight Bros
ATTORNEYS Patented Aug. 10, 1926.

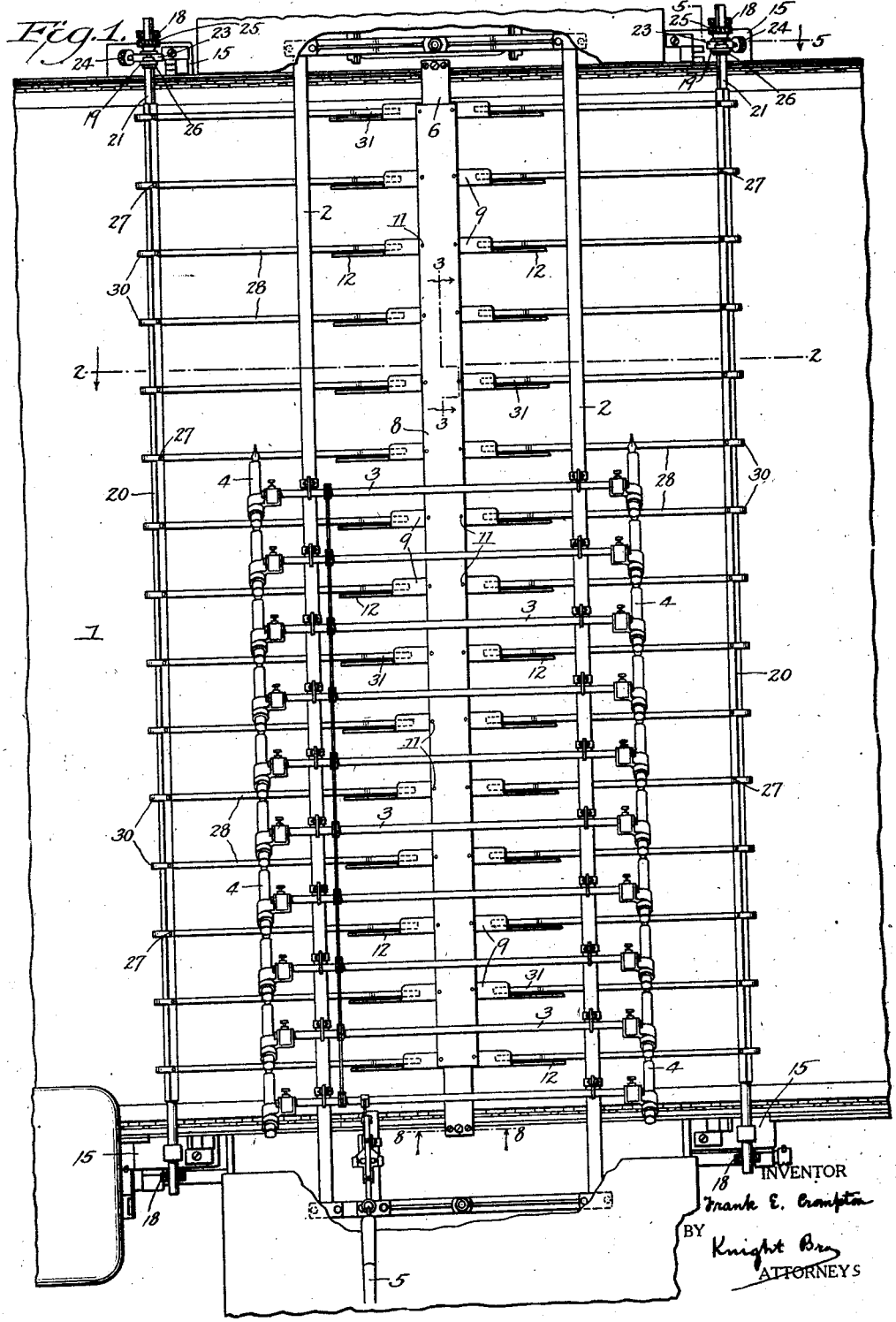

1,595,759

UNITED STATES PATENT OFFICE.

FRANK E. CROMPTON, OF GLEN ROCK, NEW JERSEY, ASSIGNOR TO THE SIGNATURE COMPANY, OF NEW YORK, N. Y., A CORPORATION OF NEW YORK.

DOCUMENT GUIDE FOR MULTIPLEX WRITING MACHINES.

Application filed August 3, 1923. Serial No. 655,480.

This invention relates to document guides for multiplex writing machines such as shown in my prior U. S. Patent No. 1,230,872, dated June 26th, 1917. The primary object of my invention is to provide an improved construction, combination and arrangement of parts in a device of this character whereby the relations between said parts may be readily and effectively adjusted, the control of the documents improved and the operation of the writing pens facilitated. Other objects of invention will appear in the specification and be pointed out in the accompanying drawings, in which—

Figure 1 is a top plan view of a multiplex writing machine provided with the improvements contemplated in the present invention.

Figure 2 is a longitudinal section of the same, according to line 2—2 of Figure 1, parts being shown in elevation.

Figure 3 is a fragmentary section on the broken line 3—3 of Figure 1, parts being broken away and parts shown in elevation.

Figure 4 is a perspective view of one of the elements comprising suitable means for limiting the upward displacement of documents in their passage across the space between the adjacent ends of oppositely disposed fingers.

Figure 5 is a fragmentary section on an enlarged scale according to line 5—5 of Figure 1, parts being broken away and parts shown in section.

Figure 6 is a section on the line 6—6 of Figure 5, parts being broken away and parts shown in elevation.

Figure 7 is a fragmentary section on an enlarged scale on the line 7—7 of Figure 6.

Figure 8 is a fragmentary section on an enlarged scale on the line 8—8 of Figure 1.

Figure 9 is a fragmentary section on an enlarged scale on the line 9—9 of Figure 8.

According to the embodiment of my invention shown on the drawings, the multiplex writing machine comprises a base plate or table 1 over which the documents are fed in groups into and out of position to be written upon by a plurality of writing pens which are mounted on a pen carriage to move in unison. Said pen carriage comprises transverse tubular bars 2 and longitudinal rods 3, the latter having the writing pens 4 mounted thereon. Said pen carriage is suitably mounted upon anti-friction bearings (not shown) so that the writing pens 4 may be moved in unison by means of a monitor 5. Extending transversely across the plate or table 1 and arranged between the rows of writing pens 4, 4, is a supporting bar 6 which may be adjusted vertically with respect to said plate or table by means to be hereinafter described. Slidably mounted upon the transverse bar 6, as shown best in Figures 2 and 3, is a bridge guide support or slide, comprising side bars 7, 7 rigidly united above by a top plate 8 which slidably engages the top surface of transverse bar 6. Extending longitudinally with respect to the direction in which documents are fed through the machine, are a plurality of bridge guides. As shown in Figure 4, each of said bridge guides has a top plate 9 provided with socket openings 10 for the reception of suitable pins or bolts 11 by means of which said top plate 9 is rigidly united to the side bars 7, 7 and top plate 8, to form a rigid frame work which is slidable on the transverse bar 6. Each of the top plates 9 is provided with a depending lateral flange 12, having its lower edge bevelled upwardly at 13, 13 towards opposite ends thereof. The top plate 9 is also provided with depending lugs or guards 14 between which and the flange 12 are normally disposed the adjacent ends of the spring fingers 28 to be presently referred to. Referring now to Figures 1, 5 and 6, it will be seen that corner-like portions 15 of the base plate or table 1, are provided with holes or sockets 16 to receive the shanks 17 of the spring finger standards which are adjustable vertically and normally retained in position by hand set screws 18. Each of said standards is bifurcated at its upper end to form laterally spaced bearing plates 19, 19, and arranged opposite to another of said standards to provide suitable bearings for the opposite ends of an oscillatory rod 20. Preferably, the rod 20 is made rectangular in cross section and is provided with reduced outer ends 21 which may also be made of rectangular cross section while at the same time being oscillatably mounted in circular holes or bearings 22 formed in the bearing plates 19, 19. Non-rotatably mounted on each end of the oscillatory rod 20 is a mutilated locking disk 23, which for this purpose may be provided with a hand set screw 24 adapted to impinge upon the reduced portion 21 of the shaft 20. As shown in plan on Figure 1, there are two transverse shafts 20, these shafts being of similar construction and similarly mounted. The mutilated disks 23 on each of these shafts may be clamped between the paired plates 19, 19, by means of clamping screws 25, each of said screws being journalled in one of said plates in each pair and threaded into a nut 26 mounted in the other plate of each pair. It will be understood therefore that either of said oscillatory shafts may be fastened in any desired angular position to which it is adjusted. Mounted on each of the shafts 20 are a plurality of parallel spring fingers for retaining the grouped documents in compact formation as they are moved into and out of position to be inscribed upon. The spring fingers on one of said shafts are presented towards but terminate short of the fingers on the other of said shafts. While in the present embodiment of my invention each finger on one shaft is arranged in substantially the same vertical plane as a corresponding finger on the other shaft, obviously this preferred arrangement may be varied without departing from the spirit of my invention. A description of one pair of oppositely presented fingers will serve to render the present construction clear. Thus, referring to Figure 2 of the drawings, the fingers are secured to their respective shafts by means of screws 27, each of said fingers 28 having an upwardly deflected portion 29 terminating in a semi-circular bend 30 which is secured in position on the shaft by means of one of the screws 27. Said bend imparts added resilience. It will be seen from an inspection of Figure 2 that the oppositely presented resilient fingers 28 have their adjacently disposed ends 31 turned upwardly so as to permit documents to be moved under them without danger of catching thereon. Suitable means for limiting the upward displacement of documents passing across the space between the adjacent ends of fingers 28 may be provided in the form of longitudinally arranged plates or flanges 12 which may be mounted in the manner hereinbefore described. Said plates or flanges are thus mounted above the document supporting table with their lower edges extending past the upwardly deflected ends 31, 31 of said fingers. This construction makes it possible to feed the documents in either direction under the opposite fingers 28, 28 without making it necessary to adjust the relations between said fingers. This construction and arrangement saves considerable time and trouble during the rapid handling of large numbers of documents and furthermore makes it possible to operate the machine with less assistance.

In this connection, it may be noted that documents operated upon by the machine at different times vary considerably with respect to size and thickness. It, therefore, becomes desirable to provide suitable means whereby the bridge guides 12 may be adjusted towards and away from the table 1 and also tilted in one direction or the other. For this purpose, the transverse supporting bar 6 is provided at each end with an adjustable mount such as that shown in Figures 8 and 9. Thus, according to these figures of the drawings, the transverse bar 6 is secured at each end to the base plate 1 by means of a stud bolt 32 which extends through an interposed block 33 and has its lower end threaded into the base plate 1. In order to permit a rocking adjustment about its longitudinal axis, the transverse bar 6 is provided at each end with a bolt hole 34 of slightly greater diameter than the bolt. On opposite sides of bolt 32 adjusting screws 35, 35, are threaded into the transverse bar 6 and impinge upon the top surface of block 33. Having adjusted the retaining bolt 32 to determine the space between bridge-guides 12 and the surface of table 1, the screws 35, 35 may be adjusted to impart the desired tilt to the bridge-guides after which lock nuts 36, 36 are used to lock the parts in their adjusted positions. Suitable means for locating the interposed blocks 33 may be provided in the form of dowel pins 37 mounted in said blocks and fitting into suitable sockets in the base plate 1. From an inspection of the drawings, it will be seen that the resilient retaining fingers 28, 28 may be adjusted laterally on the machine by an endwise movement of the oscillatory rods 20, 20 by reason of the elongated bearing portions 21, 21, which, as shown in Figures 6 and 7, are capable of extensive endwise movement. In conjunction with this adjustment to suit the arrangement of documents that are being fed through the machine, the bridge-guides 12, 12 are readily adjusted into corresponding positions without disturbing their group arrangement. During this adjustment, the relative positions between oppositely disposed, independently adjustable retaining fingers and of the bridge-guides with respect thereto, are determined by the proper location of the upturned portions 31, 31 of said fingers between the guide flange 12 and the lugs 14, 14. Furthermore, it will be seen that the elevation of fingers 28 by documents passed thereunder, will occasion a greater or less pressure by the reaction of the top plate 9 on the adjacent extremities of the resilient fingers 28, 28, depending upon the vertical adjustment of the transverse bar 6, as hereinbefore described. Said fingers 28, 28 may, moreover, be made of slighter construction and in consequence rendered less likely to blur the writing before the ink has dried. A tilting adjustment of the transverse bar 6 permits an equalization or adjustment of pressures between the oppositely disposed fingers 28, 28 of each pair. At the same time, the vertical adjustment of oscillatory rods 20, 20 may be made to vary the pressures applied from the other ends of said fingers.

I claim:—

1. In a multiplex writing machine, the combination with a table for supporting a plurality of documents to be moved into and out of position to be simultaneously written upon, of document pressing fingers presented in opposite directions toward each other but with a space between the adjacent ends thereof, and means spaced from and above said table and extending across the space between the adjacent ends of said fingers for limiting the upward displacement of said documents between said adjacent ends of the fingers.

2. In a signature machine, the combination with a document support, of oppositely presented document controlling fingers arranged with a space between their adjacent ends, and means arranged above said support and extending across said space for limiting the upward displacement of documents.

3. In a multiplex writing machine, the combination with a table for supporting a plurality of documents to be moved into and out of position to be simultaneously written upon, of document pressing fingers presented in opposite directions toward each other but with a space between the adjacent ends thereof, and means for limiting the upward displacement of said fingers and of documents between the adjacent ends of said fingers.

4. In a multiplex writing machine, the combination with a table over which documents are fed in prearranged groups to be simultaneously written upon, of oppositely-presented fingers spaced from each other in the direction of feed of said documents, a bridge-guide arranged above and limiting the upward displacement of said fingers, said bridge-guide being provided with means for limiting the upward displacement of documents passing across the space between said oppositely-presented fingers.

5. In a multiplex writing machine, the combination with means for supporting a prearranged group of documents as they are moved into and out of position to be simultaneously written upon, of spaced transverse shafts, document engaging fingers mounted on each shaft and extending towards the other shaft, the adjacent ends of oppositely presented fingers being longitudinally spaced with respect to the direction of feed of said documents, a transverse bar arranged above and intermediate to the spaced adjacent ends of said fingers, means mounted on said transverse bar for limiting the upward displacement of documents moving across the longitudinal space between said fingers, and means for raising and lowering said transverse bar.

6. In a multiplex writing machine, the combination with means for supporting a prearranged group of documents as they are moved into and out of position to be simultaneously written upon, of spaced transverse shafts, document engaging fingers mounted on each shaft and extending towards the other shaft, the adjacent ends of oppositely presented fingers being longitudinally spaced with respect to the direction of feed of said documents, a transverse bar arranged above and intermediate to the spaced adjacent ends of said fingers, means for raising and lowering said transverse bar, and for imparting a rotary adjustment thereto, a slide reciprocable on said transverse bar, and a plurality of plates mounted on said slide and arranged to limit the upward displacement of documents passing across the longitudinal space between said fingers.

7. In a multiplex writing machine, a document supporting table, transverse rods spaced from each other in the direction of feed of prearranged groups of documents, longitudinal fingers mounted on each shaft and presented towards the other shaft, the adjacent ends of corresponding oppositely presented fingers being longitudinally spaced from each other and being deflected upwardly, and bridge-guides extending across the longitudinal space between said fingers, said bridge-guides having top plates bearing upon the upwardly deflected ends of said fingers.

8. In a multiplex writing machine, the combination with a document-supporting table, of a pair of spaced transversely arranged rods, fingers mounted on said rods to extend toward but terminating short of each other, and a plate, mounted above and spaced from said table, said plate being arranged to limit the upward displacement of documents in their passage across the space between said fingers.

9. In a multiplex writing machine, the combination with a document-supporting table, of a pair of spaced transversely arranged rods, fingers mounted on said rods to extend toward but terminating short of each other, and a bridge-guide spanning the space between said fingers, said fingers having upwardly deflected extremities bearing on said bridge-guide.

10. In a multiplex writing machine, the combination with a document-supporting table, of a pair of spaced transversely arranged rods, means for vertically adjusting said rods, fingers mounted on said rods to extend toward but terminating short of each other, means spanning the space between said fingers for limiting the upward displacement of said documents, and means for imparting vertical adjustments to said document-limiting means independently of said transverse rods.

11. In a multiplex writing machine, the combination with a document-supporting table, of a pair of spaced transversely arranged rods, fingers mounted on said rods to extend toward but terminating short of each other, a plate spanning the space between said fingers for limiting the upward displacement of documents, means for imparting vertical adjustments to said document-limiting means, and means for oscillating said rods on their axes to vary the pressure exerted by said fingers upon documents passing thereunder.

12. In a signature machine, the combination with a document support, of oppositely presented document controlling fingers arranged with a space between their adjacent ends, and a bridge guide extending across said space, said bridge guide being provided with a top plate arranged above the free ends of said controlling fingers for limiting the upward displacement thereof.

13. In a machine of the character described, the combination of document controlling fingers extending towards each other and having their adjacent ends spaced apart and deflected upwardly, and means arranged above said upwardly deflected ends for limiting the upward displacement of said document controlling fingers.

14. In a machine of the character described, means for supporting documents as they are fed into and out of position to be written upon, oppositely presented fingers arranged above said supporting means and spaced from each other in the direction of feed of said documents, and means arranged above said supporting means and adapted to limit the upward displacement of documents as they progress across the space separating said fingers.

FRANK E. CROMPTON.